United States Patent [19]

Kannowade

[11] 4,027,105
[45] May 31, 1977

[54] CONTROL SYSTEM TO RE-ESTABLISH THE ORTHOGONALITY OF TWO CROSS-COUPLED ORTHOGONALLY POLARIZED TRANSMITTED SIGNALS

[75] Inventor: Heinz Kannowade, Backnang, Germany

[73] Assignee: Licentia Patent-Verwaltungs G.m.b.H., Frankfurt, Germany

[22] Filed: Feb. 20, 1976

[21] Appl. No.: 659,855

[30] Foreign Application Priority Data

Feb. 20, 1975 Germany ............................ 2507282

[52] U.S. Cl. ........................ 179/15 BC; 179/15 BP; 325/60
[51] Int. Cl.² ........................................ H04J 11/00
[58] Field of Search ............... 179/15 BC, 15 BP; 333/16, 17 R, 18, 21 R, 21 A; 325/154, 392, 472, 474, 475, 476, 371, 369, 60; 356/114

[56] References Cited

UNITED STATES PATENTS

| 3,384,824 | 5/1968 | Grener | 179/15 BC |
| 3,391,339 | 7/1968 | Lynch | 179/15 BC |
| 3,443,229 | 5/1969 | Becker | 179/15 BC |

*Primary Examiner*—David L. Stewart
*Attorney, Agent, or Firm*—Spencer & Kaye

[57] ABSTRACT

A system for re-establishing the orthogonality of two orthogonally polarized transmitted signals which are each provided with a beacon signal of a different frequency and which are cross-coupled when received. The received signals are fed to a decoupling network, including two controllable members for adjusting the orthogonality of the received signals, which separates the two received signals. The beacon signal components of each of the two received signals are coupled out, and converted to two pairs of beacon signal components with one pair of components including a first component representative of the beacon signal of one beacon signal frequency in a first of the received signals and a second component representative of the other beacon signal frequency in the first received signal (which second beacon signal component constitutes the cross-coupling of the polarization in the first received signal), and with the other pair of components including a third component representative of the beacon signal of the first beacon signal frequency in the other received signal and a fourth component representative of the second beacon signal frequency in the other received signal. The first and fourth beacon signal components are each shifted in phase by 90° and the phase shifted first third beacon signal component in a first phase-sensitive demodulator, while the phase shifted fourth beacon signal component is multiplicatively compared with the second beacon signal component in a second phase-sensitive demodulator. The signals from the demodulators are used to adjust the controllable members of the decoupling network to restore the orthogonality of the two received signals.

10 Claims, 2 Drawing Figures

CONTROL SYSTEM TO RE-ESTABLISH THE ORTHOGONALITY OF TWO CROSS-COUPLED ORTHOGONALLY POLARIZED TRANSMITTED SIGNALS

BACKGROUND OF THE INVENTION

The increasing requirements for communication systems capacity can be satisfied either by accessing higher frequencies or by using the introduced frequencies more effectively.

The capacity of a radio communication system with limited bandwidth can in theory be doubled by using orthogonally polarized waves. Such a frequency reuse system transmits two broadband channels either by two orthogonal linearly polarized waves or by two opposite-sensed circularly polarized waves. The degree of isolation between the two channels is directly related to the polarization purity of the signal waves. Reduction of polarization purity (cross-polarization coupling) is caused in practice by non-ideal rf-components, by misalignment of the antennas, by rain and — in the case of dual linearly polarized satellite communication systems — by Faraday rotation. Some of these effects are time varying in nature.

In an operational system some kind of compensation network must be provided in order to minimize cross-polarization coupling of the two broadband channels.

The present invention relates to a control system for re-establishing the orthogonality of two signals, transmitted with orthogonal polarizations, which are each provided with a beacon signal and are cross-coupled in the relay link, the cross-coupled signals being reconstituted by means of a decoupling network which comprise at least two controllable members.

The principal considerations as to how such a cross-coupling can be eliminated have been discussed by T. S. Chu: *Restoring the Orthogonality of Two Polarizations in Radio Communication Systems*, Part I, BELL SYSTEMS TECHNICAL JOURNAL, Vo. 50, No. 9, Nov. 1971, pages 3063–3069, Part II, BELL SYSTEM TECHNICAL JOURNAL, Vol. 52, No. 3, March 1973, pages 319–327.

The compensation device proposed by Chu may be placed before or behind the propagation path. Due to cross-polarization, the signal waves are in general elliptical and nonorthogonal. The ellipses are fat when the transmitted signals are dual circularly polarized and they are slender in the case of dual linear polarization. The compensation suggested by Chu is performed in two steps. First the polarizations are made linear — but not in general orthogonal — by means of a coordinate rotation and differential phase shift. Second the polarizations are orthogonalized by a further, independent coordinate rotation combined with a differential attenuation. Hence, four parameters must in general be adjusted to compensate for a given depolarization condition.

Because of the time dependancy of the cross-polarization effects the compensation network must be incorporated in an automatic control system.

SUMMARY OF THE INVENTION

It is therefore the object of the present invention to supplement the previously proposed decoupling network to produce an automatic control system.

This is accomplished, according to the present invention, in that each of the transmitted signals is provided with a beacon signal of a different frequency and the two received (and cross-coupled) signals are separated in a decoupling network including at least two controllable members for adjusting the orthogonality of the two received signals. In general-due to cross coupling — both beacons are contained in both received signals. The beacon pairs are decoupled and are down converted to two pairs of beacon signals in the intermediate frequency range with one of the pairs including a first beacon signal component representative of the beacon signal of one beacon signal frequency in the first received signal and a second beacon signal component representative of the beacon signal of the other beacon signal frequency in the first received signal, and with the other pair including a third beacon signal component representative of the beacon signal of the first beacon signal frequency in the second received signal, and a fourth beacon signal component representative of the beacon signal of the second beacon signal frequency in the second received signal. Each of the first and fourth beacon signal components is shifted in phase 90° and the phase shifted first beacon signal component is multiplicatively compared in a first phase-sensitive demodulator with the third beacon signal component (i.e., the component of the beacon signals which constitutes the cross-coupling of the polarizations in the second received signal) to form a first control value and the phase shifted fourth beacon signal component is multiplicatively compared in a second phase-sensitive demodulator with the second beacon signal component, i.e., the component of the beacon signals which constitutes the cross-coupling of the polarizations in the first received signal to form a second control value. The control values are fed to a control circuit arrangement which is responsive to the values thereof to adjust the controllable members of the decoupling network so as to restore the orthogonality of the two received signals.

Preferably the decoupling network includes four controllable members and four control values are provided. The additional two control values are formed by multiplicatively comparing the first and third beacon signal components in a third phase-sensivtive demodulator to provide the third control value and by multiplicatively comparing the second and fourth beacon signal components in a fourth phase-sensitive demodulator to provide a fourth control value. All of the control values are then fed to the control circuit arrangement which then controls the four controllable members.

According to the preferred embodiment of the invention, the beacon signals are separated from the received useful signals and converted to the two pairs of beacon signal components by means of a converter arrangement including two filters which separate the beacon signals from the incoming useful signals and whose outputs are then each converted in a separate mixer having a fixed mixing frequency, to an intermediate frequency amplified in an amplifier and made available as a pair of beacon signal components by means of a 3 dB coupler. In order to separate the individual beacon signal components, each output of the converter arrangement is connected to a bandpass filter.

According to a further feature of the invention the control values or signals are fed to the controllable members of the decoupling network via a control circuit arrangement which adjusts the associated controllable member either by moving same by means of a motor which is fed from a respective amplifier, and which has a generator coupled thereto and produces an output voltage which depends on the angular velocity of the respective motor and which is connected as a negative feedback voltage for the associated amplifier, or — in the case of electronic controllable members — the controllable members are controlled directly through the intermediary of integrators.

Advisably the frequency spacing of the beacon signals will be dimensioned so that the two bandpass filters which pass the beacon signal components representative of one beacon signal frequency ($f1$) will not permit signal components representative of the other beacon signal frequency ($f2$) to pass and the two bandpass filters which pass the beacon signal components representative of the other beacon signal frequency ($f2$) will not permit signal components representative of the one beacon signal frequency ($f1$) to pass.

The present invention makes it possible to automatically re-establish the orthogonality of two orthogonally polarized transmitted waves which are cross-coupled when received in the relay link, and to mechanically or electronically vary the parameters in the decoupling network provided for this purpose.

BRIEF DESCRIPTION OF THE DRAWING

The FIG. 1 is a block circuit diagram of a preferred embodiment of the control system according to the invention.

The FIG. 2 is a block circuit diagram of a preferred embodiment of the controllable members, suitable for the application of electronically tuned elements.

DETAILED DESCRIPTION OF THE PREFERRED EMBODIMENTS

Figure 1:
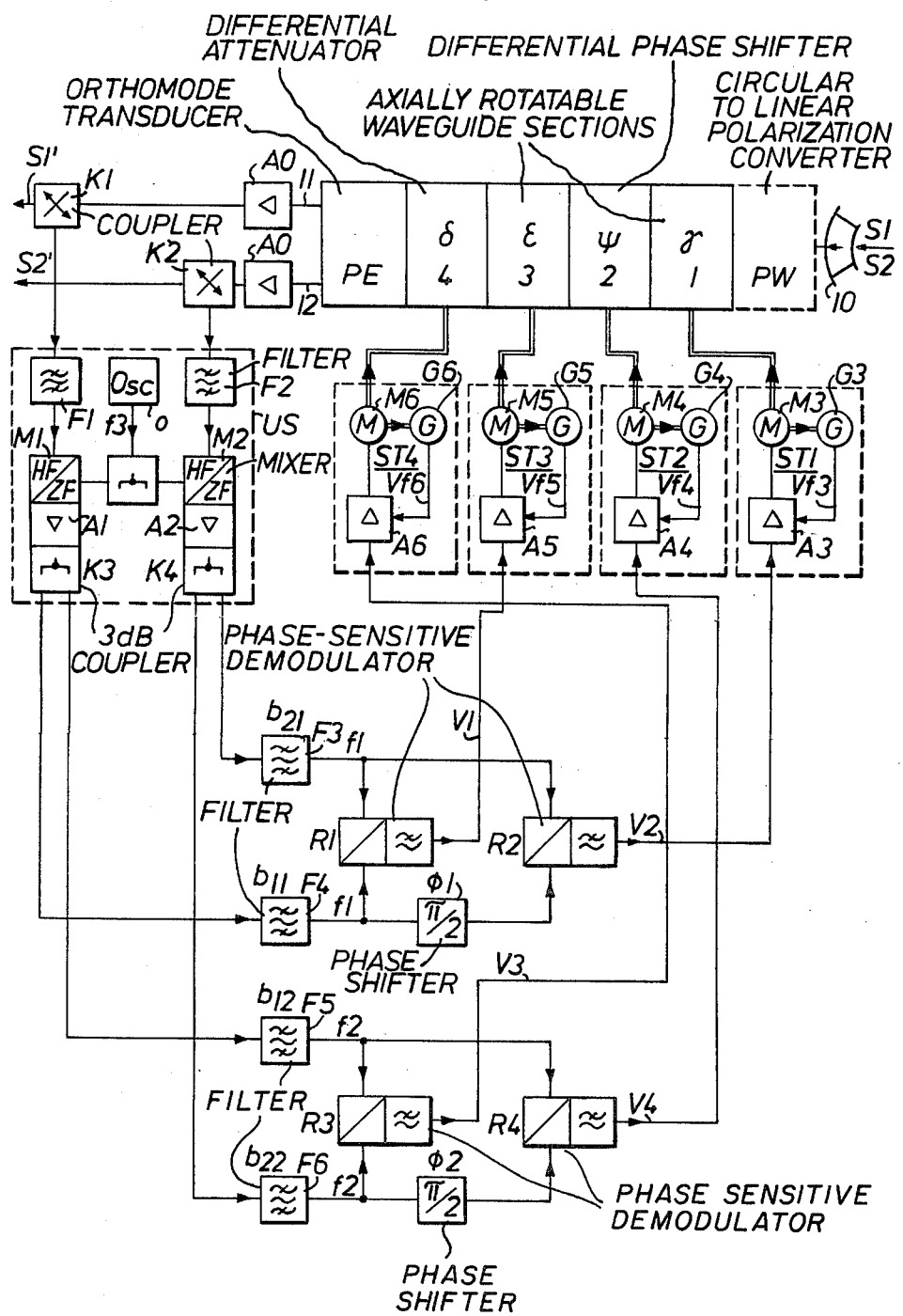

Referring now to FIG. 1, there is shown a block circuit diagram of the input of a receiver designed to receive two signals S1 and S2, transmitted with orthogonal polarizations. Each of the transmitted signals S1 and S2 represents the signal in a separate channel and includes a data signal and a beacon signal. It is understood that when the signals in the two channels were originally transmitted, a beacon signal of frequency $f1$ was added to the data signal in channel 1 and a beacon signal of frequency $f2$ was added to the data signal in channel 2. Due to cross polarization coupling, however, both beacon signal frequencies $f1$ and $f2$ will appear in both signals S1 and S2 at the receiving end.

The input circuit includes an input device, e.g., an antenna 10, whose output is connected to a decoupling network including four controllable members 1–4 connected in series with an orthomode transducer PE. The decoupling network serves to decouple transmitted orthogonally polarized waves which have been cross-coupled by extraneous influences when received. Although orthogonally linearly polarized or oppositely circularly polarized waves can be received, the decoupling network, which in the illustrated embodiment comprises mechanically driven controllable members in a doubly polarized waveguide, is designed exclusively to decouple linearly polarized waves. Accordingly, when oppositely circularly polarized waves are received, it is necessary to convert such waves into nearly polarized waves in a polarization converter PW connected between the output of the antenna 10 and the input of the decoupling network.

As mentioned above, in order to decouple the cross-coupled polarizations, according to the preferred embodiment four series connected controllable members are provided in the decoupling network. The controllable member 1 comprises a doubly polarized waveguide section which is axially rotatable with respect to the input waveguide, the antenna waveguide or the polarization filter PW, by an angle of rotation $\gamma$ (rotary joint). Controllable member 2 is a differential phase shifter disposed in a doubly polarized waveguide section and consists, for example, of two oppositely rotatable dielectric vanes. The controllable member 3 again includes a doubly polarizable waveguide section which is axially rotatably with respect to the waveguide section with the differential phase shifter 2 and has an angle of rotation $\epsilon$. Finally, controllable member 4 is a differential attenuation member by means of which the two waveguide modes can be differently attenuated in two orthogonal directions by attenuation vanes which extend into a waveguide section. It is assumed that the amplitude ratio is $\delta$. Such controllable members, per se, are well known in the art.

These four controllable members 1–4 are each adjusted by means of a separate motor as will be explained in more detail below. For reduced system requirements it is sufficient to adjust only the first and the second of the members 1–4. The parameters adjusted by the controllable members 1 and 2 have a greater influence on the re-establishment of orthogonality of the polarizations than parameters adjusted by the members 3 and 4. Accordingly, controllable members 1 and 2 must definitely be provided in the decoupling network and their respective parameters adjusted, while controllable members 3 and 4 may be eliminated for lower system requirements.

These four controllable members 1 to 4 are connected in series with an orthomode transducer PE which separates the two signal channels from one another and provides the respective signals in two separate output lines 11 and 12 as signals S1' and S2' respectively.

The beacon signals are coupled out of the two lines 11 and 12 carrying the signals S1' and S2' by means of couplers K1 and K2, respectively. In order to keep the system noise temperature low, it is advisable to decouple and further process the beacons only after they have passed through the low-noise preamplifiers Ao.

As indicated above, it is assumed that, prior to transmission a beacon signal of a frequency $f1$ was added to the data signal in channel 1 and a beacon signal of frequency $f2$ was added to the data signal in channel 2. Due to cross polarization coupling, and if the decoupling network is not matched, both beacon signals will appear at the receiving end in both signals S1' and S2'. The beacon signals decoupled at the receiving end are identified as follows:

$b_{11}$: the beacon signal coupled from channel 1 at frequency $f1$;
$b_{12}$: the beacon signal coupled from channel 1 at frequency $f2$;
$b_{21}$: the beacon signal coupled from channel 2 at frequency $f1$;
$b_{22}$: the beacon signal coupled from channel 2 at frequency $f2$.

These decoupled beacon signals are fed to a converter US and there converted and split or divided into two separate pairs of beacon signal components. In particular, in converter US the two signals S1' and S2' decoupled from the lines 11 and 12 respectively are each fed to a respective mixer M1 or M2 via a series-connected filter F1 or F2, respectively. Filters F1 and F2 permit only the frequencies $f1$ and $f2$ of the beacon signals to pass while the entire remainder of the transmission band is reflected. The bandwidth of these filters F1 and F2, respectively, depends on the frequency spacing between the two beacon signal frequencies $f1$ and $f2$ which spacing should be as narrow as possible. However, the frequency spacing between the beacon signal frequencies must be wide enough so that the beacon signal frequencies can be easily separated from one another in the subsequently arranged filters F3, F4, F5, F6 which will be explained below.

In each of the mixers M1 and M2 the output signals from the filters F1 and F2 respectively are mixed with a frequency $f3$ supplied by an oscillator O to effect a frequency conversion to an intermediate frequency, for example, 70MHz, in order to be able to handle the subsequent phase-sensitive demodulation. Each of the converted signals appearing at the output of the mixer M1 and M2 is amplified in a respective amplifier A1 or A2 and split into a first signal pair in a 3 dB coupler K3 and a second signal pair in a 3 dB coupler K4, respectively. The pairs of signals produced by the coupler K3 are fed to respective bandpass filters F4 and F5 while the pair of signals produced by the coupler K4 are fed to respective bandpass filters F3 and F6. Each of the bandpass filters F3 and F4 has a pass band such that it will pass beacon signal components representative of the beacon signal frequency $f1$ but will not pass signals representative of the beacon signal frequency $f2$ while each of the filters F5 and F6 has a pass band such that it will pass beacon signal components representative of the beacon signal frequency $f2$ but will not pass signals representative of the beacon signal frequency $f1$. Consequently signals corresponding to the beacon signal components $b_{21}$, $b_{11}$, $b_{12}$ and $b_{22}$ will appear at the outputs of filters F3, F4, F5, and F6, respectively.

In the following portion of the circuit arrangement the beacon signal components which are cross-coupled into the adjacent signal S1' or S2', respectively, are compared with the beacon signals associated with each signal S2' or S1', respectively. Thus the phase sensitive demodulators or detectors R1 and R2, which hereinafter will be called ring modulators, determine the coupling of the beacon at frequency $f1$ of signal S1 into signal S2 and ring modulators R3 and R4 determine the coupling of the beacon at frequency $f2$ of signal S2 into signal S1.

This is done in the following manner: via filter F4, ring modulator R1 receives at its first input a signal representative of the beacon signal component at frequency $f1$ of signal S1. Moreover, at its second input, ring modulator R1 receives via filter F3, a signal representative of the beacon signal component, also at frequency $f1$, which has been coupled into signal S2 due to the cross polarization coupling. This cross-coupled beacon signal component, i.e., $b_{21}$, is a measure for the cross-coupling between the two polarizations. Ring modulator R1 emits a direct voltage V1 which is derived from the multiplicative comparison of the two beacon signal components and which is fed to the associated controllable member, in this case controllable member 3, via a respective control circuit St3.

In ring modulator R2 a further control value V2 is generated. For this purpose the first input of ring modulator R2 receives a signal representative of the component of the beacon signal at a frequency $f1$ which has been coupled into a signal S2 due to cross-coupling, i.e., $b_{21}$. While the second input of ring modulator R2 receives the signal representative of the beacon signal at frequency $f1$ of signal S1 which has been shifted in phase by 90° in a phase shifting member $\phi 1$. The control value V2 is fed to the controllable member 1 via a further control circuit S$t$1.

The direct voltage or control value V1 is here proportional to the cosine of the phase difference between the two outputs of filters F3 and F4 and control value V2 is proportional to the sine of the phase difference between the two outputs of filters F3 and F4. The polarity of these control values results from a positive or negative sine or cosine, respectively.

In a corresponding manner control values V3 and V4 are obtained with the aid of ring modulators R3 and R4 respectively and phase shifter $\phi 2$ from the coupled-in beacon component of the beacon at frequency $f2$ of signal S2 into signal S1.

It is to be understood that in this arrangement filters F4 and F6 can be replaced by phase locked loops (PLL) if desired.

The control values V1, V2, V3 and V4 produced by the ring modulators R1, R2, R3 and R4 respectively are fed to control circuits S$t$3, S$t$1, S$t$4 and S$t$2 respectively. It is to be understood however that if desired, the control value V1 can be interchanged with the control value V3, and the control value V2 can be interchanged with the control value V4. The motorized adjustment of the parameters employed in this embodiment provides that the respective control value, for example, V1, is fed to the amplifier A5 of control circuit S$t$3, the amplifier having an attenuation input to stabilize its motor M5. The output of amplifier A5 is connected to the motor M5 and furnishes a direct voltage, control value V1, for a required correction of the parameter adjusted by controllable member 3. This control value V1 causes motor M5 to rotate in a direction determined by the polarization of control value V1 and move the controllable member 3, which is mechanically coupled to the motor, by a desired amount.

In order to stabilize the motor M5, e.g., a servo motor, a negative feedback for the amplifier A5 is provided. The negative feedback is provided by a generator G5 which is coupled to the motor M5 and which emits an output voltage V$f5$ which is appropriate for the angular velocity of the motor M5. This output voltage from generator G5 is fed to amplifier A5 and added with the appropriate sign to the incoming control value V1 in the amplifier A5.

In a similar manner the control circuit S$t$1 contains the amplifier A3, the motor M3 and the generator G3, the control circuit S$t$2 includes the amplifier A4, the motor M4 and the generator G4, and the control circuit S$t$4 includes the amplifier A6, the motor M6 and the generator G6.

It is to be understood that with the appropriate configuration of the controllable members 1 through 4 it is possible to effect the desired adjustment electronically. In such case the drive motors M3–M6 are replaced by integrators.

A circuit configuration suitable for the application of electronically tuned controllable members is described in: H. Kannowade, "Automatic Compensation of Cross-Polarization Coupling in Communication Systems Using Orthogonal Polarizations", Proceedings of the Microwave Propagation Symposium, April 1975, Graz, Austria, to be published in the ESRO. SP-series (see FIGS. 7, 8 and 9 of the above mentioned paper).

Figure 2:
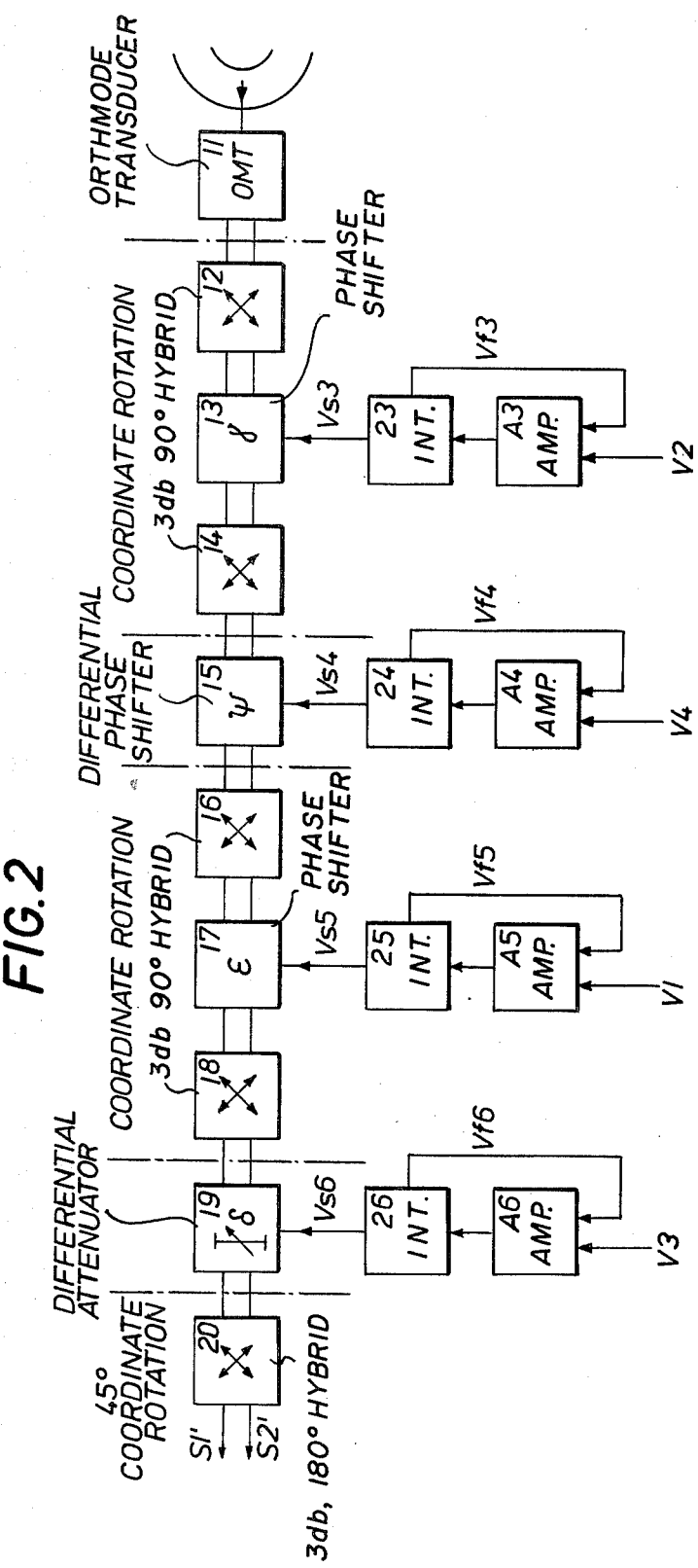

FIG. 2 shows a possible embodiment of the four controllable members. The orthomode transducer (11) preceeds the decoupling network. The blocks 12, 14, 16 and 18 represent 3dB, 90°-hybrids, block 20 represents a 3dB, 180°-hybrid, blocks 12, 15, and 17 represent pin-diode phase shifters and block 19 represents a pin-diode attenuator.

The block 12, 13 and 14 realize the function of a coordinate rotation corresponding to the controllable member 1 in FIG. 1.

The differential phase shifter, block 15 of FIG. 2, corresponds to the controllable member 2 in FIG. 1. The blocks 16, 17 and 18 of FIG. 2 realize the function of a coordinate rotation corresponding to the controllable member 3 in FIG. 1.

The differential attenuator block 19 of FIG. 2, corresponds to the controllable member 4 in FIG. 1. An additional fixed coordinate rotation of 45° is required, realized by block 20 of FIG. 2, which in the embodiment of FIG. 1 is realized by the appropriate angular position of the orthomode transducer PE with respect to the controllable member 4.

The integrators 23, 24, 25 and 26 of FIG. 2 correspond to the motors M3, M4, M5, M6 of the embodiment of FIG. 1. The negative-feedback-voltages $Vf3$, $Vf4$, $Vf5$ and $Vf6$ have to be proportional to rate of change of the integrator output voltages $Vs3$, $Vs4$, $Vs5$ and $Vs6$.

The configuration of FIG. 2 is suitable for handling signals, which have been transmitted with orthogonal linear polarizations. For dual circular polarized signals, the function of the polarization converter in FIG. 1 is obtained by dropping the 3dB-hybrid (block 12) in FIG. 2.

It will be understood that the above description of the present invention is susceptible to various modifications, changes and adaptations, and the same are intended to be comprehended within the meaning and range of equivalents of the appended claims.

What is claimed is:

1. A control system for re-establishing the orthogonality of two transmitted orthogonally polarized signals which are cross-coupled when received in a relay link, one of said transmitted signal being provided with a beacon signal of a first frequency and the other of said transmitted signals being provided with a beacon signal of a second different frequency, said system comprising in combination: means for receiving said two transmitted signals; decoupling network means, having its input connected to the output of said receiving means and including at least first and second series connected controllable members for adjusting the orthogonality of said received signals, for providing a respective one of said two signals at each of its two outputs; means, connected to said outputs of said decoupling network means, for coupling out the beacon signal components from each of said output signals from said decoupling network means and for converting the coupled out beacon signal components into two pairs of beacon signal components with one of said pairs including a first beacon signal component representative of the beacon signal of said first frequency in a received one of said transmitted signals and a second beacon signal component representative of the beacon signal of said second frequency in said received one of said transmitted signals, and with the other of said pairs including a third beacon signal component representative of the beacon signal of said first frequency in the received other of said transmitted signals and a fourth beacon signal component representative of the beacon signal of said second frequency in said received other of said transmitted signals; phase shifting means for shifting the phase of each of said first and fourth beacon signal components by 90°; a first phase sensitive demodulator means for multiplicatively comparing said phase shifted first beacon signal component with said third beacon signal component to form a first (V2) control signal; a second phase sensitive demodulator means for multiplicatively comparing said second beacon signal component with said phase shifted fourth beacon signal component to form a second (V4) control signal; and means responsive to the value of said first and said second control signals for adjusting said controllable members to restore the orthogonality of the two received signals.

2. A control system as defined in claim 1 wherein: said first controllable member is a doubly polarizable waveguide section which is rotatable about its longitudinal axis with respect to the waveguide section of said receiving means; said second controllable member is a differential phase shifter disposed in a doubly polarizable waveguide section; and said means for adjusting is responsive to said first and second control signals for adjusting said first and second controllable members respectively.

3. The control system as defined in claim 1 wherein: said decoupling network means further includes third and fourth series connected controllable members; and further comprising: a third phase sensitive demodulator means for multiplicatively comparing said first and said third beacon signal components to form a third (V1) control signal; and a fourth phase sensitive demodulator means for multiplicatively comparing said second and said fourth beacon signal components to form a fourth (V3) control signal; and wherein said means for adjusting is responsive to said first, second, third and fourth control signals to adjust all of said controllable members.

4. A control system as defined in claim 3 wherein: said first controllable member is a doubly polarizable waveguide section which is rotatable about its longitudinal axis with respect to the waveguide section of said receiving means, said second settable member is a differential phase shifter disposed in a doubly polarizable waveguide section; said third controllable member is a doubly polarizable waveguide section which is rotatable about its longitudinal axis with respect to said second controllable member; said fourth controllble member is a differential attenuator disposed within a doubly polarizable waveguide section; and said means for adjusting is responsive to the values of said first, second, third and fourth control signals for adjusting said first, (V2) second (V4), third (V1) and fourth (V3) controllable members respectively.

5. A control system as defined in claim 3 wherein: said first controllable member is a doubly polarizable waveguide section which is rotatable about its longitudinal axis with respect to the waveguide section of said receiving means; said second controllable member is a differential phase shifter disposed in a doubly polarizable waveguide section; said third controllable member is a doubly polarizable waveguide section which is rotatable about its longitudinal axis with respect to said second controllable member; said fourth controllable member is a differential attenuator disposed within a doubly polarizable waveguide section; and said means for adjusting is responsive to said first, second, third and fourth control signals for adjusting said second (V4), first (V2), fourth (V3) and third (V1) controllable members respectively.

6. A control system as defined in claim 1 wherein said means for coupling out and converting includes: first and second filter means, each coupled to a respective output of said decoupling network means, for passing the beacon signal frequencies and rejecting the other frequencies of the two received signals; first and second mixer means, connected to the outputs of said first and second filter means, respectively, for mixing the respective output signals from said filter means with a mixing frequency to convert said respective output signals to signals in an intermediate frequency range; first and second amplifiers connected to the outputs of said first and second mixer means respectively; and first and second 3 dB couplers, each having its input connected to the output of a respective one of said first and second amplifiers and each providing a pair of output signals.

7. A control system as defined in claim 6 wherein: said means for converting further includes: first, second, third and fourth bandpass filters each connected to a respective one of the outputs of said 3 dB couplers.

8. A control system as defined in claim 7 wherein one of the two bandpass filters connected to each coupler passes the intermediate frequency associated with said first beacon signal frequency and does not pass the intermediate frequency associated with the second beacon signal frequency, and the other of said two bandpass filters connected to each coupler passes the intermediate frequency associated with said second beacon signal frequency and does not pass the intermediate frequency associated with said first beacon signal frequency, whereby said two pairs of beacon signal components appear at the outputs of said first, second, third, and fourth bandpass filters.

9. A control system as defined in claim 1 wherein said means for adjusting includes a plurality of control circuits, one for each of said controllable members and each being responsive to the value of a separate one of said control signals, each of said control circuits including: a servo motor whose output is connected to and controls the position of the associated said controllable member; an amplifier having its output connected to said motor for controlling same and having its input connected to the output of the associated said phase sensitive demodulator means; and a negative feedback loop including a generator which is mechanically coupled to said servo motor for producing an output voltage whose value depends on the angular velocity of said servo motor, the output of said generator being connected to said amplifier.

10. A control system as defined in claim 1 wherein said means for adjusting comprises a plurality of electronic control circuits, one for each of said controllable members and each being responsive to the value of a separate one of said control signals, each of said control circuits including an integrator having its output connected to the associated one of said controllable members for controlling same, and an amplifier having its output connected to the input of said integrator and having its input connected to the output of the associated said phase-sensitive demodulator means.

* * * * *